United States Patent [19]

Tatsumi

[11] Patent Number: 5,751,767
[45] Date of Patent: May 12, 1998

[54] CHANNEL QUALITY MONITORING BY DETECTING, BASED ON A FADING PITCH DETECTED IN AN RSSI, A BER IN AN ACCUMULATED PHASE LIKELIHOOD DATUM

[75] Inventor: Satoshi Tatsumi, Tokyo, Japan

[73] Assignee: NEC Corporation, Tokyo, Japan

[21] Appl. No.: 752,144

[22] Filed: Nov. 19, 1996

[30] Foreign Application Priority Data

Nov. 22, 1995 [JP] Japan ................... 7-304316

[51] Int. Cl.$^6$ ................... H04B 3/46; H04B 17/00
[52] U.S. Cl. ................... 375/224; 375/227; 455/67.3; 455/226.2
[58] Field of Search ................... 375/224, 227, 375/229, 347; 455/67.3, 226.1, 226.2; 371/5.1

[56] References Cited

FOREIGN PATENT DOCUMENTS 3-205940  9/1991  Japan.

OTHER PUBLICATIONS

H. Tomita et al., "Digital Intermediate Frequency Demodulation Technique", *Proceedings of 1990 Autumn General Meeting of the Institute of Electronics, Information, and Communication Engineers in Japan*, Paper No. B-299, p. 299.

*Primary Examiner*—Stephen Chin
*Assistant Examiner*—Betsy L. Deppe
*Attorney, Agent, or Firm*—Sughrue, Mion, Zinn, Macpeak & Seas, PLLC

[57] ABSTRACT

In a channel quality monitoring device comprising a phase detector for phase likelihood data of an input PSK modulated signal, an accumulator for an accumulated phase likelihood datum during a predetermined time interval, a BER calculating circuit for calculating a BER by using the accumulated datum, and a judging circuit for judging a channel quality by the BER, a pitch detector detects in the PSK modulated signal a selected fading pitch for making the BER calculating circuit produce as the BER an instantaneous BER at a time at which the time interval ends. Preferably, the pitch detector comprises an RSSI circuit for RSSI's of the PSK modulated signal and a pitch selector for selecting the instantaneous fading pitch from a plurality of fading pitches detected in the RSSI's. The BER calculating circuit comprises a plurality of BER calculator in correspondence to predetermined fading frequencies, relative to which BER's are preliminarily empirically decided versus the accumulated datum.

18 Claims, 6 Drawing Sheets

CHANNEL QUALITY MONITORING BY DETECTING, BASED ON A FADING PITCH DETECTED IN AN RSSI, A BER IN AN ACCUMULATED PHASE LIKELIHOOD DATUM

BACKGROUND OF THE INVENTION

This invention relates to a method of and a device for monitoring a channel or line quality and, more particularly, to a method and a device which are for use in mobile communication resorting to PSK (phase shift keying) modulation.

In the manner which will later be described in greater detail, known is a conventional channel quality monitoring device comprising a phase detector for detecting phase likelihood data in an input PSK modulated signal, a rate calculating circuit for calculating a BER (bit error rate) by accumulating the phase likelihood data during a predetermined time interval, and a judging circuit for judging the channel quality by the BER. In Japanese Patent Prepublication (A) No. 205,940 of 1991, a digital demodulator is disclosed for use in demodulating an angular modulated signal. For use in the conventional channel quality monitoring device, the phase detector may be an adaptive carrier tracking (ACT) phase detector used in the patent prepublication. Alternatively, the phase detector may be a digital delay detector described in a paper contributed by Hideho Tomita and two others in the Japanese language to Proceedings of 1990 Autumn General Meeting of the Institute of Electronics, Information, and Communication Engineers in Japan, page 2–299, as Paper No. B-299 under the title of "Digital Intermediate Frequency Demodulation Technique".

At any rate, the channel quality is monitored in compliance with close relationships which are present in PSK modulation between the BER and the phase likelihood data. When a PSK modulated signal is received under adverse propagation or reception circumstances, the phase likelihood data are great to raise the BER. When the propagation circumstances are excellent, the phase likelihood data are small to lower the BER. It has therefore been the practice to preliminarily determine the relationships between the BER and the phase likelihood data and to use the relationships relative to the phase likelihood data in calculating the BER.

The propagation circumstances are dependent on fading in a radio channel used as a propagation channel. More specifically, a fading pitch or frequency is variable from time to time to give rise to an irregular fluctuation in the BER. This had rendered it difficult, if not impossible, to correctly and reliably monitor the channel quality.

SUMMARY OF THE INVENTION

It is consequently an object of the instant invention to provide a method of monitoring a channel quality which may be subjected to a fluctuation with time.

It is another object of this invention to provide a method which is of the type described and which is applicable to monitoring a radio channel quality.

It is still another object of this invention to provide a method which is of the type described and which can correctly and reliably monitor the channel quality even in the presence of a variation in propagation circumstances.

It is yet another object of this invention to provide a method which is of the type described and which can correctly and reliably monitor the channel quality even if an input phase shift keying modulated signal is subjected to fading.

It is a further object of this invention to provide a channel quality monitoring device for implementing a method of the type described.

Other objects of this invention will become clear as the description proceeds.

In accordance with an aspect of this invention, there is provided a method of monitoring a channel quality, comprising the steps of (a) detecting phase likelihood data in an input phase shift keying modulated signal, (b) accumulating the phase likelihood data during a predetermined time interval to derive a bit error rate, and (c) judging the channel quality by the bit error rate, wherein the bit error rate is derived by the steps of (A) detecting a selected fading pitch in the phase shift keying modulated signal and (B) calculating the bit error rate based on the selected fading pitch by using the phase likelihood data.

In accordance with a different aspect of this invention, there is provided a channel quality monitoring device comprising (a) a phase detector for detecting phase likelihood data in an input phase shift keying modulated signal, (b) an accumulating circuit for accumulating the phase likelihood data during a predetermined time interval to derive a bit error rate, and (c) a judging circuit for judging the channel quality by the bit error rate, wherein the accumulating circuit comprises (A) a pitch detector for detecting a selected fading pitch in the phase shift keying modulated signal and (B) a rate calculating circuit for calculating the bit error rate based on the selected fading pitch by using the phase likelihood data.

DESCRIPTION OF THE PREFERRED EMBODIMENT

Figure 1:
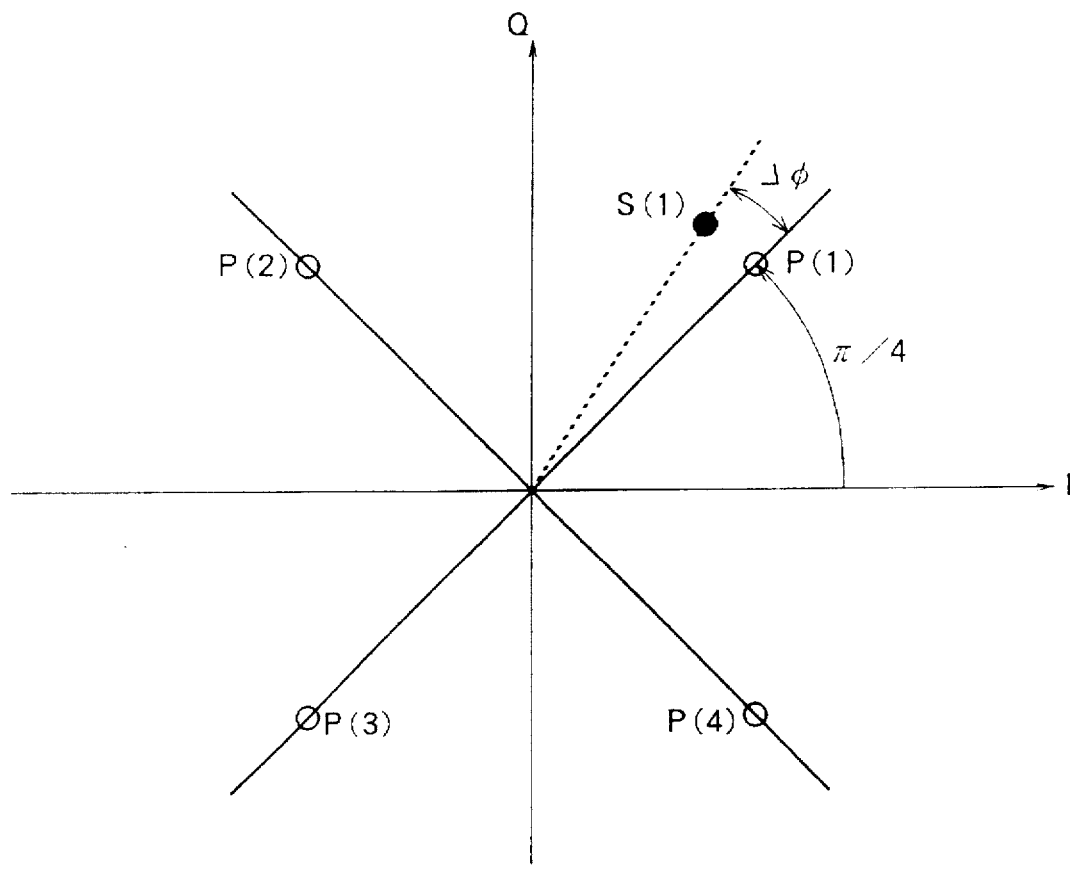
FIG. 1 shows a phase plane for use in describing a phase likelihood datum.

Referring to FIG. 1, a phase likelihood datum will first be described in connection with a QPSK (quadrature phase shift keying) modulated signal which is reproduced by a phase detector used in general in a portable digital telephone device. The QPSK modulated signal is a representative of a PSK (phase shift keying) differential code modulated signal, in which each symbol of a modulating signal is differentially encoded into a symbol datum.

The phase likelihood datum is depicted on a phase plane defined by I (in phase) and Q (quadrature phase) axes which are orthogonal to each other at an origin O and among which the I axis is used as a reference line. Basically, the signal data have four discrete phases represented by a first phase point P(1) shifted by π/4 from the reference line in a positive direction towards the Q axis and by second, third, and fourth phase points P(2), P(3), and P(4) which are successively shifted from the first phase point by π/2 in the positive direction.

In an ideal case, the phase detector should detect a phase difference of ±π/4 or ±3π/4 relative to a phase of the symbol datum at a certain instant of time. For example, the symbol datum of a time instant should be represented by the first phase point P(1). In practice, a phase error Δφ is produced in the symbol datum by fading or by thermal noise of circuitry, where φ may be positive or negative. As a result, the symbol datum is detected as a detected datum represented by a detected phase point S(1). The phase error is called the phase likelihood datum.

Figure 2:
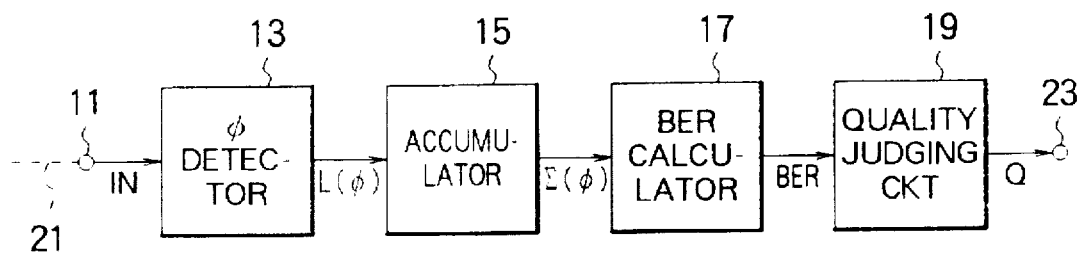
FIG. 2 is a block diagram of a conventional channel quality monitoring device.

Turning to FIG. 2, a conventional channel quality monitoring device has a device input terminal 11 supplied with a PSK differential code modulated signal as an input signal IN. Supplied with the input signal from the device input terminal 11, a phase detector 13 successively produces for the symbol phase likelihood data described in conjunction with FIG. 1. The phase likelihood data will be denoted by L(φ) merely for convenience of the denotation. In the manner described heretobefore, the phase detector 13 may be that used in Japanese Patent Prepublication (A) No. 205,940 of 1991 or alternatively be that described in the Tomita et al paper.

An accumulator 15 accumulates the phase likelihood data supplied from the phase detector 13 during a predetermined time interval into an accumulated datum Σ (φ) where the argument φ represents here the phase likelihood data. When each symbol has a long period in the modulating signal, the predetermined interval may be equal to a duration of one symbol datum. Alternatively, the predetermined time interval may be equal to another duration of four symbol data particularly when fading is slowly variable.

Supplied from the accumulator 15 with the accumulated data from time to time, a BER (bit error rate) calculator 17 calculates a BER of the input PSK differential code modulated signal at each time instant. Based on such BER's supplied from the BER calculator 17, a quality judging circuit 19 judges a channel quality QUAL or Q of a radio or propagation channel 21 through which the PSK differential code modulated signal is fed to the device input terminal 11 and which may be put under objectionable propagation circumstances by the fading. The channel quality is delivered to a device output terminal 23.

Figure 3:
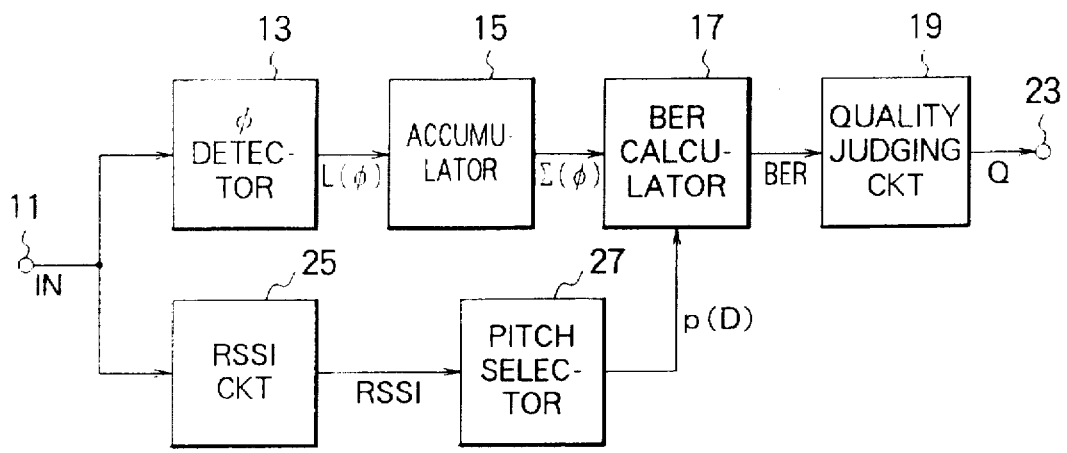
FIG. 3 is a block diagram of a channel quality monitoring device according to an embodiment of the instant invention.

Referring now to FIG. 3, the description will proceed to a channel quality monitoring device according to a preferred embodiment of the present invention. Throughout the following, similar parts are designated by like reference numerals and are similarly operable with likewise named signals except for the BER calculator 17 which is operable as will later be described in details and is herein called a BER or rate calculating circuit.

In FIG. 3, the input PSK differential code modulated signal IN is supplied from the device input terminal 11 additionally to an indicator producing circuit 25 which is labelled an RSSI (received signal strength indicator) CKT and is for producing an RSSI signal indicative of successive RSSI's of the input signal IN. From the RSSI signal supplied from the RSSI circuit 25, a fading pitch selector 27 detects a fading pitch p(D) at each time instant to produce a fading pitch signal representative of detected fading pitches as fading pitch data from time to time.

Controlled by the fading pitch signal to use the accumulated datum supplied from the accumulator 15 when the fading pitch signal represents each detected fading pitch, the BER calculating circuit 17 calculates the BER's for the fading pitch data, respectively, namely, for the detected fading pitches, respectively. Based on these BER's, the quality judging circuit 19 delivers an instantaneous channel quality to the device output terminal 23 at each time instant.

Figure 4:
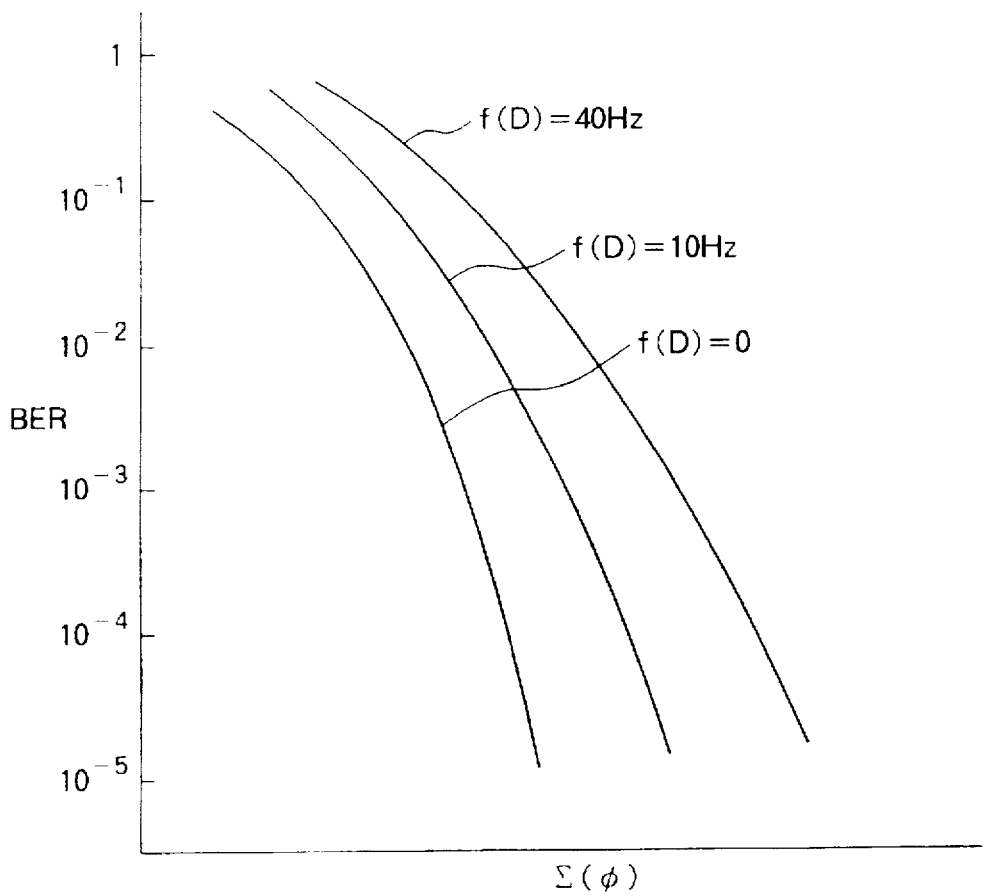
FIG. 4 shows relationships between a bit error rate and an accumulation of phase likelihood data for a few fading frequencies.

Turning to FIG. 4 with FIG. 3 continuously referred to, the BER is scaled along the ordinate versus the accumulated datum Σ (φ) which varies along the abscissa to increase leftwards and to decrease rightwards. As exemplified by a few curves with a fading frequency f(D) used as a parameter, the BER is greater when the fading frequency is higher, such as 40 Hz. The BER is smallest when the fading is absent, as indicated by f(D)=0. In other words, the channel quality becomes worse when the fading frequency is higher.

A plurality of fading frequencies f(D) or fading pitches p(D) are therefore predetermined in order to put the BER calculator 17 in operation under control by the fading pitch selector 27. Using such predetermined fading pitches which may be first through N-th fading pitches, the BER's are preliminarily measured for various accumulated data of the phase likelihood data. In such a manner, relationships are empirically decided between the BER and the accumulated datum for the first through the Nth fading pitches. With reference to the relationships, the BER calculating circuit 17 calculates the BER's for the predetermined fading pitches, respectively, by using the accumulated datum produced by the accumulating circuit 15. It is possible to decide a predetermined number N for the first through the N-th fading pitches or frequencies in consideration of variableness of the fading which may disturb the propagation circumstances and hence the channel quality of the propagation channel.

Figure 5:
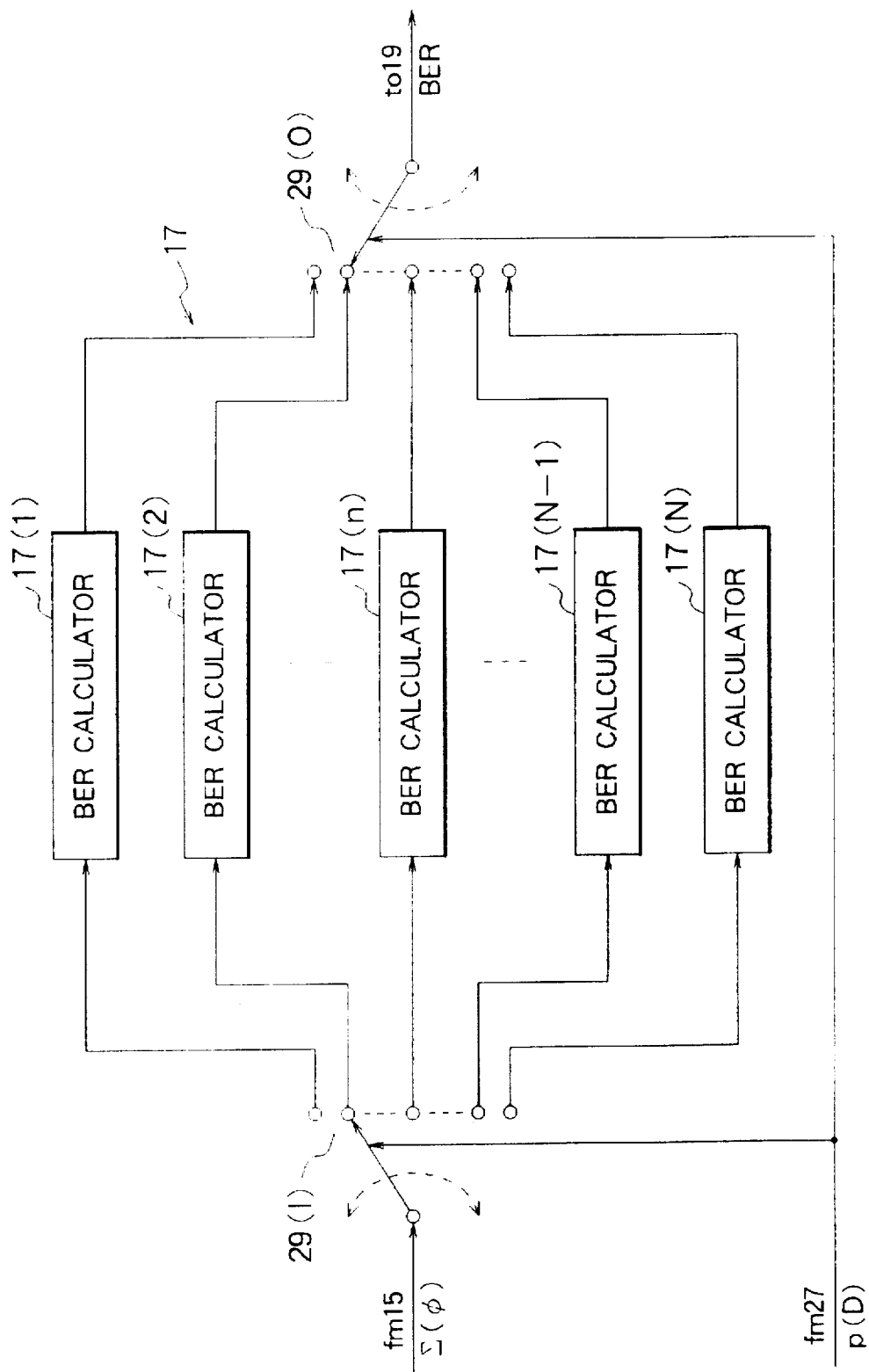
FIG. 5 is a block diagram of a part of the channel quality monitoring device illustrated in FIG. 3.

Referring afresh to FIG. 5 and continuously to FIGS. 3 and 4, the BER calculating circuit 17 comprises first through N-th BER calculators 17(1), 17(2), ..., 17(n), ..., 17(N-1), and 17(N) in correspondence to the first through the N-th fading pitches. A switch 29 comprises input and output parts 29(I) and 29(O) which are depicted as mechanical switches merely for convenience of illustration and are controlled by the fading pitch signal p(D) of the fading pitch selector 27 to connect one of the first through the N-th BER calculators 17 (the suffixes 1 to N omitted), such as the n-th BER calculator 17(n), to the accumulator 15 and to the quality judging circuit 19 that is selected by a selected one of the predetermined fading pitches or selected fading pitch. Each of the first through the Nth BER calculators 17 calculates the BER in response to one of the relationships exemplified in FIG. 4 relative to the accumulated datum that corresponds to the selected fading pitch.

Referring anew to FIG. 6 and again to FIG. 3, an example of the fading pitch selector 27 comprises a low-pass filter (LPF) 31 supplied from the indicator producing circuit 25 with the RSSI signal RSSI and filters away a modulating signal component, an intermediate frequency component, and similar non-low-frequency components from the RSSI signal to produce a fading frequency component. It may be mentioned here that the input PSK defferential code modulated signal IN and hence the RSSI signal may include a plurality of modulating frequency components depending on periods or lengths of the symbol data and the intermediate frequency component derived by quadrature detection of a radio frequency signal to produce the input PSK differential code modulated signal and that the intermediate frequency components, collectively referred to herein as the modulating frequency component, and intermediate frequency component are sufficiently higher in frequency than the fading frequency component.

Connected to the low-pass filter 31, an differentiator 33 comprises an operational amplifier 35 having inverted and non-inverted input terminals and an output terminal, a series capacitor C between the low-pass filter and the inverted input terminal, and a parallel resistor R between the inverted input terminal and the output terminal. The non-inverted input terminal is grounded. The differentiator 33 consequently differentiates the fading frequency component to produce a differentiated signal at the output terminal of the operational amplifier 35.

As will shortly become clear, the differentiated signal of the differentiator 33 is converted by a comparator 37 to a logic value signal representative of logic values of the differentiated signal. Connected to the comparator 37, a timer 39 detects a clock pitch of the logic values to produce the clock pitch as the detected fading pitch for supply to the BER calculating circuit 17.

Figure 6:
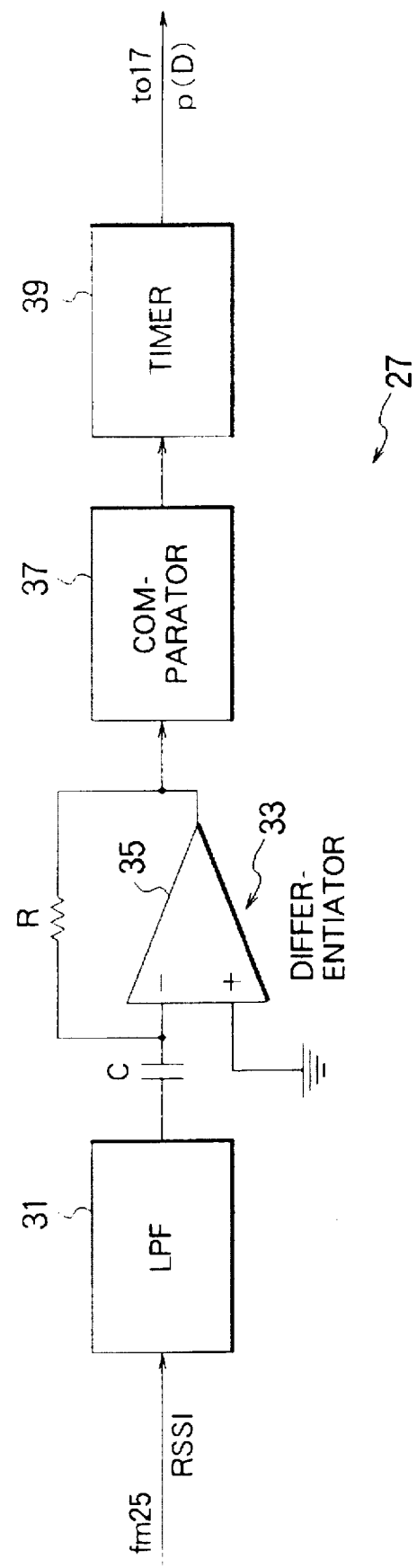
FIG. 6 is a block diagram of another part of the channel quality monitoring device depicted in FIG. 3.
Figure 7:
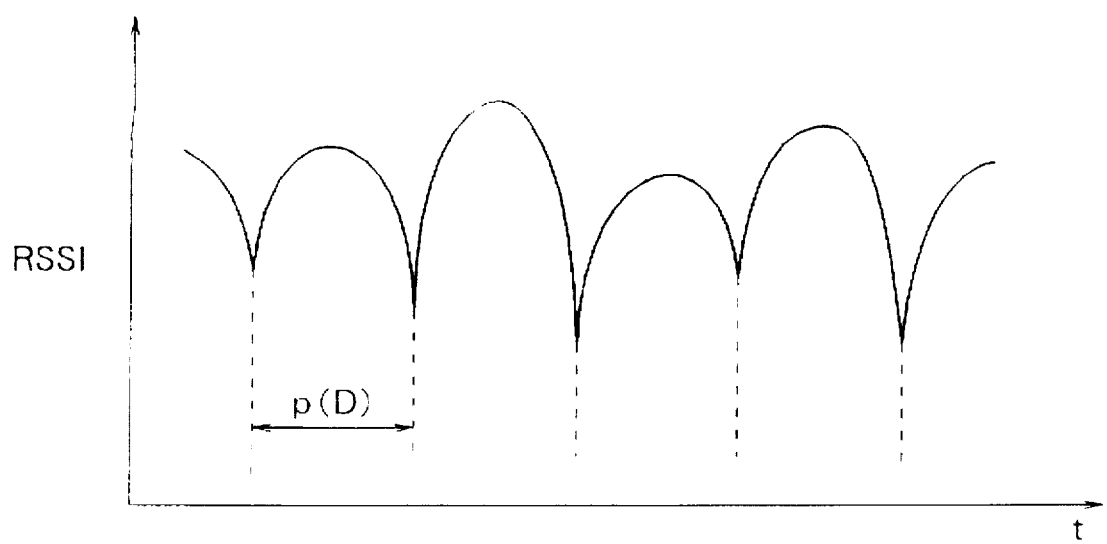
FIG. 7 schematically exemplifies a received signal strength indicator.
Figure 8:
FIG. 8 schematically shows a differentiated signal derived from the received signal strength indicator depicted in FIG. 7.
Figure 9:
FIG. 9 schematically shows a logic value signal of the differentiated signal illustrated in FIG. 8.

Turning to FIGS. 7 through 9 with FIG. 6 continuously referred to, wave forms of the fading frequency component, the differentiated signal, and the logic value signal are schematically exemplified, respectively, together with the fading pitch. The waveforms will be used in describing operation of the fading pitch detector 27 illustrated with reference to FIG. 6.

In the manner depicted in FIG. 7, the fading frequency component has sharp downwardly protruded cusps. Two adjacent ones of the cusps are spaced apart by the fading pitch which is presumed constant in the example being illustrated and is denoted by the reference symbol p(D).

As shown in FIG. 8, the differentiated signal sharply rises upwards above ground whenever the fading frequency component sharply falls down. In FIG. 9, the logic values build down when the differentiated signal sharply rises. Build down of the logic value signal therefore occurs concurrently at the fading pitch or pitches. The timer 39 detects intervals at which the logic values build down. As a consequence, the fading pitch detector 27 detects the fading pitches from time to time.

Figure 10:
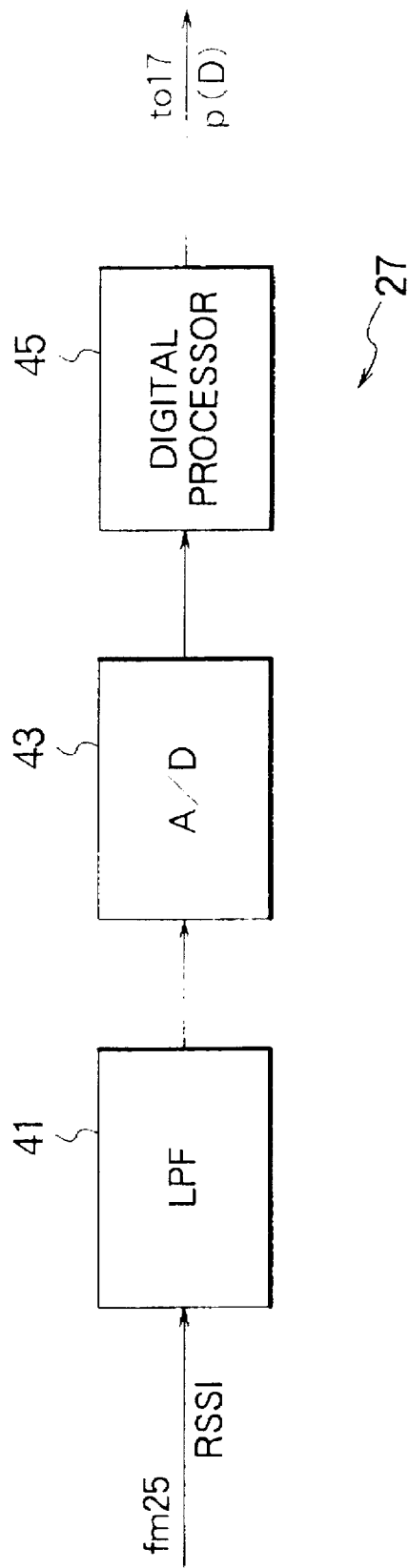
FIG. 10 is another block diagram of the part mentioned in connection with FIG. 6.

Referring now to FIG. 10 together with FIG. 3, another example of the fading pitch selector 27 comprises a low-pass filter (LPF) 41 which is similar to the low-pass filter 31 described in conjunction with FIGS. 6 and 7. The low-pass filter 41 produces the pitch frequency component in response to the RSSI signal supplied from the indicator producing circuit 25 to indicate the RSSI's from time to time.

Connected to the low-pass filter 41, an analog-to-digital converter (A/D) 43 converts the fading frequency component to a digital signal. Connected to the analog-to-digital converter 43, a digital signal processor 45 processes the digital signal into the fading pitch signal which is not different from that produced by the timer 39 of FIG. 6 and is delivered to the fading pitch detector 17.

Reviewing FIGS. 3 through 10, it is now understood that the fading pitch detector 27 detects an instantaneous fading pitch at a time instant at which each predetermined time duration ends. Consequently, the BER calculating circuit 17 calculates an instantaneous BER at each of such time instants to make the quality judging circuit 19 monitor the channel quality from time to time.

A combination of the indicator producing circuit 25 and the pitch selector 27 serves as a pitch detecting circuit for detecting the selected or instantaneous fading pitch in the input PSK differential code modulated signal IN. The pitch detecting circuit (25, 27) and the BER calculating circuit 17 are operable together with the accumulator 15 collectively as an accumulating circuit for accumulating the phase likelihood data during the predetermined time interval to derive the BER.

While this invention has thus far been described in specific conjunction with a single preferred embodiment thereof, it will now be readily possible for one skilled in the art to put this invention into effect in various other manners. For example, it is possible to use a method and a device according to this invention to monitoring of the channel quality in connection with an input multiphase PSK modulated signal.

What is claimed is:

1. A method of monitoring a channel quality, comprising the steps of;

detecting phase likelihood data in an input phase shift keying modulated signal, accumulating said phase likelihood data during a predetermined time interval, calculating a bit error rate, and judging said channel quality by said bit error rate; wherein said bit error rate is calculated by the steps of;

detecting a selected fading pitch in said phase shift keying modulated signal; and calculating said bit error rate based on said selected fading pitch by using accumulated phase likelihood data.

2. A method as claimed in claim 1, wherein said fading pitch detecting step detects said selected fading pitch in said shift keying modulated signal at a time instant at which said predetermined time interval ends.

3. A method as claimed in claim 2, wherein said bit error rate calculating step derives said bit error rate from said phase likelihood data in compliance with relationships empirically decided between said bit error rate and said phase likelihood data for said selected fading pitch.

4. A method as claimed in claim 3, wherein said pitch detecting step comprises the steps of:

producing a received signal strength indicator from said phase shift keying modulated signal; and selecting said selected fading pitch in said received signal strength indicator at said time instant.

5. A method as claimed in claim 4, comprising the steps of;

placing said phase likelihood data into an accumulated dawn, and wherein said bit error rate calculating step comprises calculating a plurality of bit error rates for a respective plurality of fading pitches, including said selected fading pitch by using said accumulated phase likelihood data, and selecting said selected bit error rate from said plurality of bit error rates in response to said selected fading pitch.

6. A method as claimed in claim 5, wherein said fading pitch selecting step comprises the steps of:

filtering away a modulation frequency component and an intermediate frequency component from said received signal strength indicator to produce a fading frequency component;

differentiating said fading frequency component into a differentiated signal;

calculating logic values of said differentiated signal; and detecting a clock pitch of said logic values at said time instant as said selected fading pitch.

7. A method as claimed in claim 5, wherein said fading pitch selecting step comprises the steps of:

filtering away a modulation frequency component and an intermediate frequency component from said received signal strength indicator to produce a fading frequency component;

analog-to-digital converting said fading frequency component to a digital signal; and digital processing said digital signal into said selected fading pitch at said time instant.

8. A method as claimed in claim 5, wherein said fading pitch selecting step comprises the steps of:

filtering away a modulation frequency component and an intermediate frequency component from said received signal strength indicator to produce a fading frequency component;

differentiating said fading frequency component into a differentiated signal;

calculating logic values of said differentiated signal; and detecting a clock pitch of said logic values at said time instant as said selected fading pitch.

9. A method as claimed in claim 5, wherein said fading pitch selecting step comprises the steps of:

filtering away a modulation frequency component and an intermediate frequency component from said received signal strength indicator to produce a fading frequency component;

analog-to-digital converting said fading frequency component to a digital signal; and digital processing said digital signal into said selected fading pitch at said time instant.

10. A channel quality monitoring device comprising;

a phase detector for detecting phase likelihood data in an input phase shift keying modulated signal, an accumulating circuit for accumulating said phase likelihood data during a predetermined time interval, a bit error rate calculator for calculating a bit error rate, and a judging circuit for judging a channel quality by said bit error rate;

wherein said bit error rate calculator comprises;

a pitch detector for detecting a selected fading pitch in said phase shift keying modulated signal, and an error rate calculating circuit for calculating said bit error rate based on said selected fading pitch by using accumulated phase likelihood data.

11. A channel quality monitoring device as claimed in claim 10, wherein said pitch detector detects said selected fading pitch in said phase shift keying modulated signal at a time instant at which said predetermined time interval ends.

12. A channel quality monitoring device as claimed in claim 11, wherein said error rate calculating circuit derives said bit error rate from said phase likelihood data in compliance with relationships empirically determined between said bit error rate and said phase likelihood data for said selected fading pitch.

13. A channel quality monitoring device as claimed in claim 12, wherein said pitch detector comprises:

an indicator producing circuit for producing a received signal strength indicator from said phase shift keying modulated signal; and a pitch selector for selecting said selected fading pitch in said received signal strength indicator at said time instant.

14. A channel quality monitoring device as claimed in claim 13, said accumulating circuit placing said accumulated phase likelihood data into an accumulated datum, wherein said error rate calculating circuit comprises;

rate calculators for calculating a plurality of bit error rates for a respective plurality of fading pitches, including said selected fading pitch, by using said accumulated datum, and a switch for selecting said selected bit error rate from said bit error rates in response to said selected fading pitch.

15. A channel quality monitoring device as claimed in claim 14, wherein said pitch selector comprises:

a low-pass filter for filtering away a modulation frequency component and an intermediate frequency component from said received signal strength indicator to produce a fading frequency component;

a differentiator for differentiating said fading frequency component into a differentiated signal;

a comparator for calculating logic values of said differentiated signal; and a timer for detecting a clock pitch of said logic values at said time instant as said selected fading pitch.

16. A channel quality monitoring device as claimed in claim 14, wherein said pitch selector comprises:

a low-pass filter for filtering away a modulation frequency component and an intermediate frequency component from said received signal strength indicator to produce a fading frequency component;

an analog-to-digital converter for converting said fading frequency component to a digital signal; and a digital signal processor for processing said digital signal into said selected fading pitch.

17. A channel quality monitoring device as claimed in claim 14, wherein said pitch selector comprises:

a low-pass filter for filtering away a modulation frequency component and an intermediate frequency component from said received signal strength indicator to produce a fading frequency component;

a differentiator for differentiating said fading frequency component into a differentiated signal;

a comparator for calculating logic values of said differentiated signal; and a timer for detecting a clock pitch of said logic values at said time instant as said selected fading pitch.

18. A channel quality monitoring device as claimed in claim 14, wherein said pitch selector comprises:

a low-pass filter for filtering away a modulation frequency component and an intermediate frequency component from said received signal strength indicator to produce a fading frequency component;

an analog-to-digital converter for converting said fading frequency component to a digital signal; and a digital signal processor for processing said digital signal into said selected fading pitch at said time instant.

* * * * *